(12) United States Patent
Saleh et al.

(10) Patent No.: US 11,535,255 B2
(45) Date of Patent: Dec. 27, 2022

(54) MICRO-WEATHER REPORTING

(71) Applicant: Toyota Motor North America, Inc., Plano, TX (US)

(72) Inventors: Aghyad Saleh, Grand Prairie, TX (US); Jason Schell, Dallas, TX (US); Neil Dutta, Addison, TX (US)

(73) Assignee: Toyota Motor North America, Inc., Plano, TX (US)

( * ) Notice: Subject to any disclaimer, the term of this patent is extended or adjusted under 35 U.S.C. 154(b) by 954 days.

(21) Appl. No.: 16/288,781

(22) Filed: Feb. 28, 2019

(65) Prior Publication Data
US 2020/0276977 A1 Sep. 3, 2020

(51) Int. Cl.
| | | |
|---|---|---|
| *B60W 40/02* | (2006.01) | |
| *G01W 1/10* | (2006.01) | |
| *G05D 1/00* | (2006.01) | |
| *G05D 1/02* | (2020.01) | |
| *G01C 21/36* | (2006.01) | |

(52) U.S. Cl.
CPC ......... *B60W 40/02* (2013.01); *G01C 21/3691* (2013.01); *G01W 1/10* (2013.01); *G05D 1/0088* (2013.01); *G05D 1/0295* (2013.01)

(58) Field of Classification Search
None
See application file for complete search history.

(56) References Cited

U.S. PATENT DOCUMENTS

| | | | |
|---|---|---|---|
| 8,060,308 B2 | 11/2011 | Breed | |
| 2011/0235627 A1 | 9/2011 | Wang | |
| 2012/0215446 A1 | 8/2012 | Schunder et al. | |
| 2015/0353088 A1* | 12/2015 | Ishikawa | B60W 50/0097 701/23 |
| 2016/0019788 A1 | 1/2016 | Milne et al. | |
| 2018/0201273 A1* | 7/2018 | Xiao | B60W 30/18154 |

OTHER PUBLICATIONS

Massaro et al., "The Car as an Ambient Sensing Platform", Proceedings of the IEEE, vol. 105, No. 1, Jan. 2017 (5 pages).
IMB Research Editorial Staff, "IMB scientists team with The Weather Company to bring edge computing to life", IBM Research Blog, Feb. 15, 2017 (8 pages).
"AI, Autonomous Vehicles & Predictive Analytics: How Weather Telematics' Technology Can Save Lives", Internet of Things, undated (6 pages).
AccuWeather, "Introducing AccuWeather Go on Garmin Automotive Platform", www.AccuWeather.com, Jan. 9, 2018 (5 pages.).

* cited by examiner

*Primary Examiner* — Roy Y Yi
(74) *Attorney, Agent, or Firm* — Christopher G. Darrow; Darrow Mustafa PC

(57) ABSTRACT

Systems and methods for vehicle-based weather detection are disclosed herein. The systems and methods can include selecting one or more vehicles from a plurality of vehicles based on one or more network membership parameters. One or more data acquisition networks can be formed using the one or more selected vehicles. Sensor data can be received from the one or more data acquisition networks. One or more weather conditions can be predicted using the sensor data. One or more environmental elements can be updated based on the predicted weather conditions.

18 Claims, 7 Drawing Sheets

MICRO-WEATHER REPORTING

TECHNICAL FIELD

The subject matter described herein generally relates to weather reporting and, more particularly, vehicle-based monitoring of weather conditions.

BACKGROUND

Monitoring and reporting the weather is a continuous concern for vehicles on the road. As weather changes, vehicle control and safety can change with it. Numerous weather events can affect the vehicle's ability to handle the road, which creates further danger with regards to other vehicles being operated in the same vehicular environment and/or pedestrians.

SUMMARY

Disclosed herein are systems and methods for networked crowdsourcing of the detection of weather conditions in a vehicular environment. In one or more implementations, a collaborative forecasting system for vehicle-based weather detection is disclosed. The collaborative forecasting system can include one or more processors and a memory communicably coupled to the one or more processors. The memory can store a coordination module including instructions that when executed by the one or more processors cause the one or more processors to select one or more vehicles based on one or more network membership parameters and form one or more data acquisition networks using the one or more selected vehicles. The memory can further store a prediction module including instructions that when executed by the one or more processors cause the one or more processors to receive sensor data from the one or more data acquisition networks based on one or more detection parameters and predict one or more weather conditions using the sensor data. The memory can further store a response module including instructions that when executed by the one or more processors cause the one or more processors to update one or more environmental elements based on the one or more predicted weather conditions.

In further implementations, a non-transitory computer-readable medium for vehicle-based weather detection is disclosed. The non-transitory computer-readable medium can store instructions that when executed by one or more processors cause the one or more processors to select one or more vehicles from a plurality of vehicles based on one or more network membership parameters. The memory can further store instructions to form one or more data acquisition networks using the one or more selected vehicles. The memory can further store instructions to receive sensor data from the one or more data acquisition networks based on one or more detection parameters. The memory can further store instructions to predict one or more weather conditions using the sensor data. The memory can further store instructions to update one or more environmental elements based on the one or more predicted weather conditions.

In further implementations, a method for vehicle-based weather detection is disclosed. The method can include selecting one or more vehicles from a plurality of vehicles based on one or more network membership parameters. The method can further include forming one or more data acquisition networks using the one or more selected vehicles. The method can further include receiving sensor data from the one or more data acquisition networks based on one or more detection parameters. The method can further include predicting one or more weather conditions using the sensor data. The method can further include updating one or more environmental elements based on the predicted weather conditions.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more implementations may be advantageously adapted for utilization in other implementations described herein.

DETAILED DESCRIPTION

Figure 1:
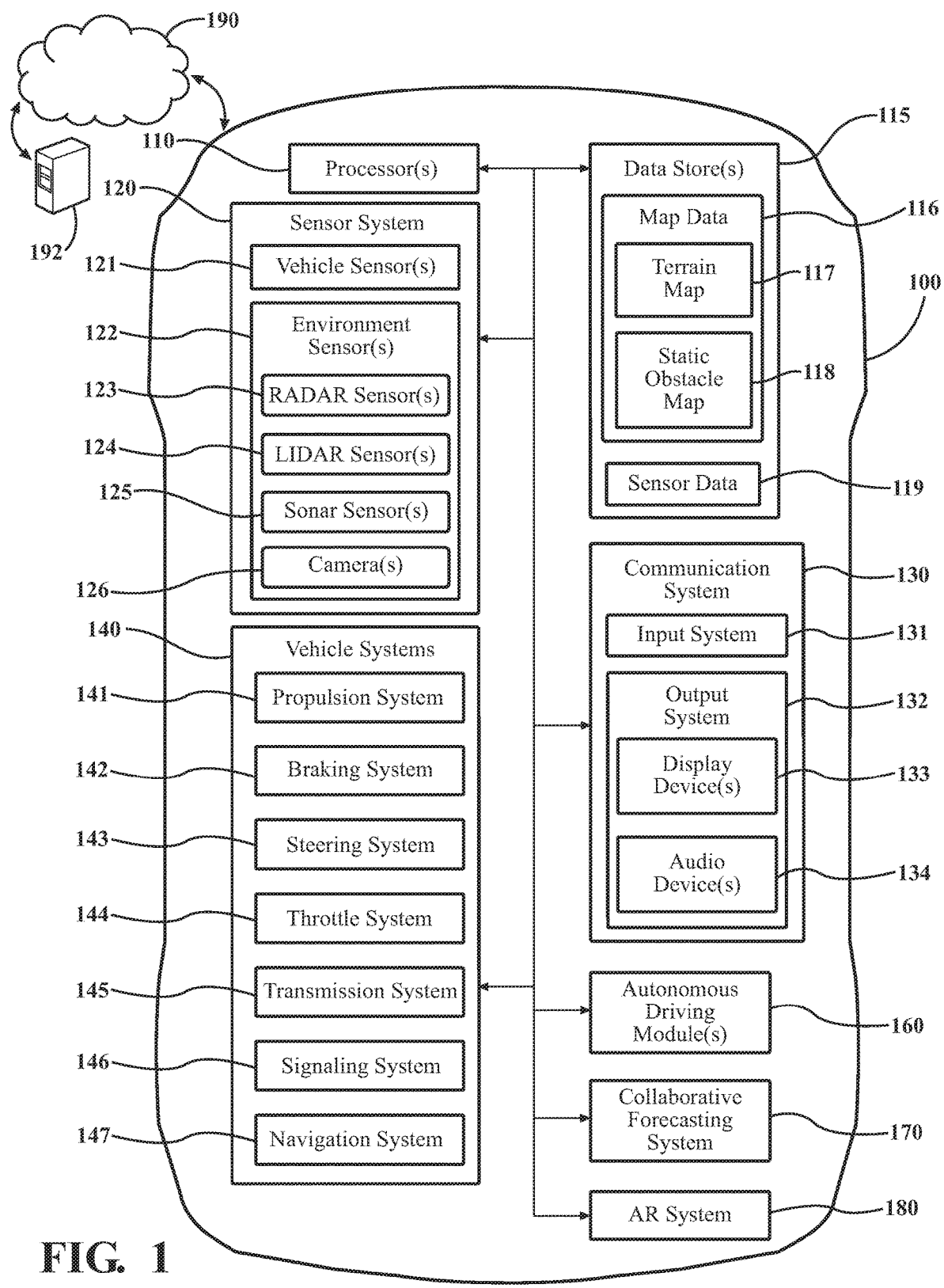
FIG. 1 is a block diagram of a vehicle incorporating a collaborative forecasting system, according to implementations described herein.

The implementations disclosed herein generally relate to systems and methods for vehicle-based weather detection using a collaborative forecasting system. The collaborative forecasting system can use one or more network membership parameters to select vehicles to become part of a data acquisition network. The network membership parameters, as used herein, are parameters which the vehicles can meet to become part of a data acquisition network for collecting weather data. A plurality of vehicles in a vehicular environment can be connected to one another, such as through a mesh network, to create the data acquisition network. Data acquisition network(s), as used herein, are groupings of selected vehicles in network communication with one another for the collection of sensor data. The network membership parameters can include vehicle capability parameters. Vehicle capability parameters generally include one or more vehicle-specific criteria, for example, a type of sensors included on the vehicle, a make/model of the vehicle, networking capability of the vehicle, or other attributes of the vehicle as desired. The network membership parameters can also include geographic parameters, such as location of the vehicles or proximity of the vehicles to one another or some reference point. The combination of elements that make up the one or more network membership parameters for data acquisition network can be operator-selectable.

One or more of the vehicles in the data acquisition network may include sensors for detecting weather-related data, such as rain, snow, hail, temperature, atmospheric pressure (e.g., a barometer) or other weather conditions. The sensors may detect weather conditions and generate data based on their connection to the data acquisition network. In some implementations, the sensors may be connected to a local processor for filtering the data before it is uploaded to the network generally and/or an edge computing device.

The vehicles in the data acquisition network can transmit weather information to one or more computing devices, such as edge computing devices, in real-time. The multiple vehicles may transmit sensor data and/or weather information to the computing devices over a wireless connection, for example, a Bluetooth low energy connection or a 5G connection. In some implementations, the vehicles may maintain a cache of sensor data and/or weather data. The sensor data and/or the cache can be uploaded to a computing device along including metadata, such as a time stamp, when the vehicle is in a connection range of a computing device or other connection point. In some implementations, the multiple vehicles may receive information from the computing device. In one example, the computing device can broadcast real-time local or micro weather to vehicles in the area, based in part on sensor data or weather data received from one or more data acquisition networks. The implementations disclosed herein are further described with reference to the figures below.

Referring to FIG. 1, an example of an autonomous device, specifically a vehicle 100, is illustrated. The vehicle 100 can include a collaborative forecasting system 170 or components and/or modules thereof. As used herein, a "vehicle" is any form of motorized transport. In one or more implementations, the vehicle 100 can be an automobile. In some implementations, the vehicle 100 may be any other form of motorized transport that, for example, can operate autonomously, semi-autonomously, or manually by an in-vehicle operator. The vehicle 100 can include the collaborative forecasting system 170 or capabilities to support or interact with the collaborative forecasting system 170, and thus benefits from the functionality discussed herein. While arrangements will be described herein with respect to automobiles, it will be understood that implementations are not limited to automobiles, but any form of vehicle. Instances of the vehicle, as used throughout, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Figure 2:
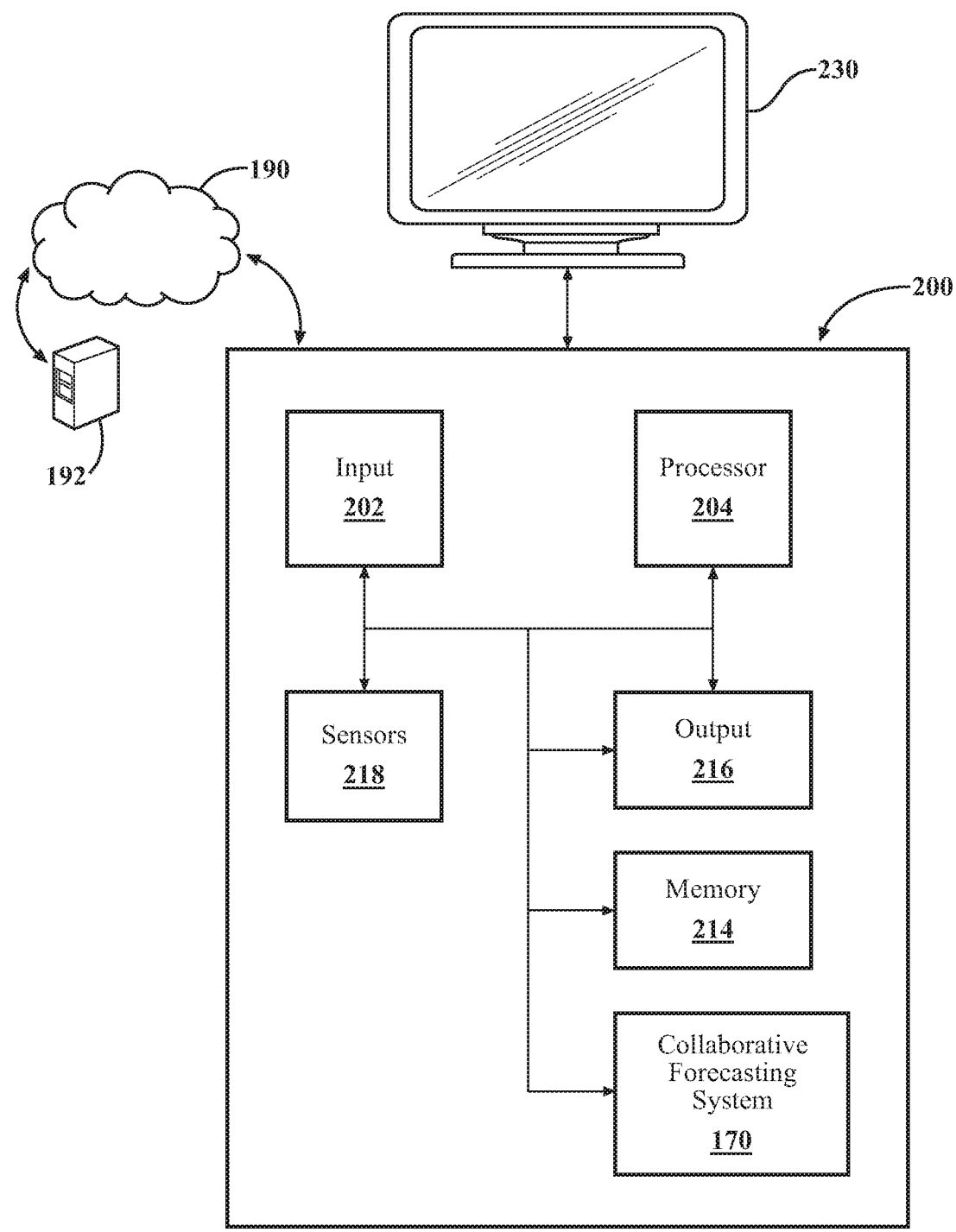
FIG. 2 is a block diagram of a computing device incorporating a collaborative forecasting system, according to implementations described herein

FIG. 2 is an example of a computing device 200. The computing device 200 can include any programmable electronic device designed to accept data, perform mathematical and/or logical operations under the control of software. The computing device 200 can include the collaborative forecasting system 170 or capabilities to support or interact with the collaborative forecasting system 170, and thus benefits from the functionality discussed herein. In implementations described herein, the vehicle 100 can be in communication with a computing device 200. The vehicle 100 or other device being in communication with the computing device 200 refers to any forms of direct or indirect communication between the computing device 200 and the vehicle 100, including direct wired communication, communication through one or more intermediary computing devices, communication through the cloud, or combinations thereof. The computing device 200 and the vehicle 100 can communicate through the use of a variety of wired or wireless networks. In some implementations, the computing device 200 can be a server which is remote from the vehicle 100. In further implementations, the computing device 200 can be integrated into the vehicle 100, such as an embedded system. The computing device 200 can include a collaborative forecasting system 170 that is implemented to perform methods and other functions as disclosed herein.

Some of the possible elements of the vehicle 100 and the computing device 200 are shown in FIG. 1 and FIG. 2 respectively. These elements will be described herein, along with subsequent figures. However, a description of many of the elements in FIG. 1 and FIG. 2 will be provided after the discussion of FIGS. 3-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the implementations described herein. It will of course be understood that the implementations described herein may be practiced using various combinations of these elements.

Figure 3:
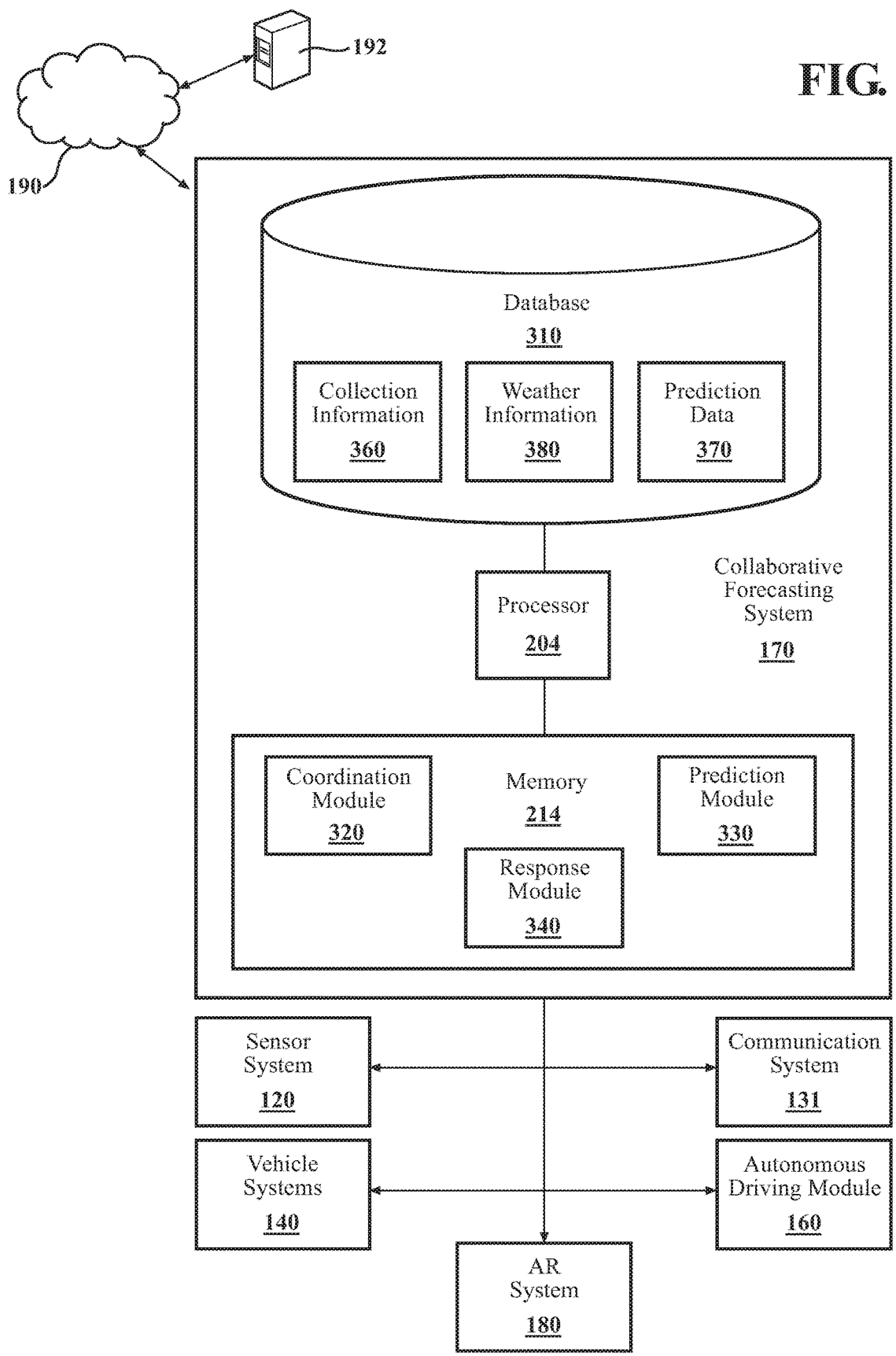
FIG. 3 is a collaborative forecasting system according to one or more implementations.

The collaborative forecasting system 170 is described in connection with reference to FIG. 3. The collaborative forecasting system 170 can include one or more modules to select and coordinate one or more vehicles as part of one or more data acquisition networks. The collaborative forecasting system 170 can further collect sensor data from the one or more data acquisition networks or vehicle sensors in accordance with one or more detection parameters, predict one or more weather conditions based on the sensor data, and/or update maps or other items accordingly. Detection parameters, as used herein, generally relate to types, categories, and/or amounts of data and/or information for use in making determinations, such as predicting weather conditions and/or about one or more detectable events. The collaborative forecasting system 170 generally includes a processor, such as a processor 204 from the computing device 200, depicted in FIG. 2. Accordingly, the processor 204 can be a part of the collaborative forecasting system 170, the collaborative forecasting system 170 can include a separate processor from the processor 204 of the computing device 200, the processor 110 of the vehicle 100, or the collaborative forecasting system 170 can access the processor 204 or the processor 110 through a data bus or another communication path.

In some implementations, the collaborative forecasting system 170 can include memory 214 that stores a coordination module 320, a prediction module 330, and a response module 340. The memory 214 can be a suitable memory for storing the modules 320, 330, and 340, such as a Random Access Memory (RAM), Read-Only Memory (ROM), a hard disk drive, a flash memory, other suitable memory, or combinations thereof. The modules 320, 330, and 340 can be, for example, computer-readable instructions that when executed by the processor 204, cause the processor 204 to perform the various functions disclosed herein. In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The collaborative forecasting system 170 can further include a database, such as a database 310. The database 310 can include data or information for use as part of the implementation of the collaborative forecasting system 170 described herein. The database 310 can include data or information collected, formulated, processed, derived, or manipulated from a variety of sources. In one implementation the database 310 can be a part of the memory 214. In further implementations, the database 310 can be separate from the memory 214, including being stored locally or remotely in a separate memory.

In one or more implementations, the collaborative forecasting system 170 can include collection information 360, prediction data 370, and weather information 380. The collection information 360 can include data and information with relation to the selection of one or more vehicles, the formation of the one or more data acquisition networks, and/or parameters related to detection of the sensor data. In some implementations, the collection information 360 can include the one or more network membership parameters, the one or more detection parameters, network formation details, and other elements to guide the vehicle capability. The prediction data 370 can include information and data related to one or more weather events. The prediction data 370 can include the sensor data, metadata about the sensor data (e.g., sensor type, timestamp, vehicle location, etc.), correlation between sensor data, and other information which can be used in future predictions, as received by the one or more data acquisition networks or other related elements to the collaborative forecasting system 170. The prediction data 370 can include historical weather data for a given area over any period of time. The weather information 380 can include predictions and determinations as formed by the collaborative forecasting system 170. The weather information 380 can include predicted weather conditions and map data including environmental elements. The collaborative forecasting system 170 can store the collection information 360, the prediction data 370, and weather information 380 as part of the database 310, the memory 214, in an additional memory such as part of the server 192, or others as appropriate.

The collaborative forecasting system 170 can use instructions from the coordination module 320. The coordination module 320 can generally include instructions that function to control the processor 204 to select one or more vehicles based on one or more network membership parameters. The network membership parameters can include vehicle capability parameters can generally relate to the type of data which the vehicle has the capacity to collect. As such, the vehicle capability parameters can be used to guide the selection of appropriate vehicles for the purposes of data collection. The vehicle capability parameters can relate to the availability and useful life of sensors, use of specialized sensors, the reliability of sensors, or others which tend to indicate the ability to collect certain data. Examples of the vehicle capability parameters can include vehicle generation, sensor reliability, and sensor availability.

Alternatively or in addition to vehicle capability parameters, the membership parameters can include geographic parameters. For instance, the coordination module 320 can include instructions that function to control the processor 204 to select one or more vehicles based on a predefined geographic area. The predefined geographic area can be defined in any suitable manner, such as vehicles within a radius from a reference point or within specified geographic boundaries. Still further, the membership parameters can be any vehicle(s) selected by user input or any other type of parameters.

In further implementations, the coordination module 320 can create groups of selected vehicles. The coordination module 320 can make one or more selections of one or more selected vehicles based on a set of network membership parameters. The coordination module 320 can receive, collect, or solicit information from the plurality of vehicles about the vehicle capability parameters (e.g., a single sensor) and/or the sets of vehicle capability parameters (e.g., groups of sensors which relate to a specific data type or vehicle functionality). The sets of vehicle capability parameters used in the selection of groups of selected vehicles, can be the same, overlap, or the wholly distinct from one another. Therefore, the groups of selected vehicles and the related data acquisition networks can be selected to perform different roles within the same or different vehicular environment. The groups of selected vehicles can, thus, perform distinct roles in relation to the collection of sensor data.

Using the one or more network membership parameters, the coordination module 320 can select one or more vehicles from a plurality of vehicles. The plurality of vehicles can be all available vehicles or a selection therefrom, such as vehicles within a certain range. The coordination module 320 can receive information from the plurality of vehicles with relation to the network membership parameters. The coordination module 320 can, through the processor(s) 204, determine which of the plurality of vehicles is appropriate or capable in light of the one or more network membership parameters.

In further implementations, the coordination module 320 can use historical interactions as a vehicle capability parameter or as a modifier for a vehicle capability parameter. In one example of a historical interaction being used as a vehicle capability parameter, the coordination module 320 can include a selection of vehicles from the plurality of vehicles based on historical interaction with the collaborative forecasting system 170. In another example with the historical interaction being used as a modifier for a vehicle capability parameter, the coordination module 320 can select one or more selected vehicles from the plurality of vehicles based on a vehicle capability parameter. The coordination module can weigh the historical interaction with the collaborative forecasting system 170 against the vehicle capability parameter to decide whether to maintain the selection. As well, the coordination module 320 can include a selection of vehicles from the plurality of vehicles based on a desired vehicle capability parameter, as modified by a historical interaction with the collaborative forecasting system 170. In some examples, the coordination module 320 can review the reliability and/or capability of one or more of the plurality of vehicles, based on the previous ability of the vehicles to provide the desired sensor data (e.g., the detection parameters).

The network membership parameters can further relate to planned actions for each of the plurality of vehicles. In one or more implementations, vehicle behaviors like speed or route can affect the ability of a sensor to function for an intended purpose (e.g., weather information). Thus, one or more of the plurality of vehicles can have a speed or route which makes the selection of the vehicle unsuitable for the data acquisition network. As such, the coordination module 320 can be configured to include or exclude vehicles based on vehicle behavior. In some implementations, the coordination module 320 can provide a communication to one or more of the plurality of vehicles which indicates a desired selection of the vehicle. The communication can further include a request for action predictive data indicating route, speed, or other factors which may affect the timing, occurrence, or capability of a specific vehicle. A related communication can be provided to one or more alternate vehicles of the plurality of vehicles. The coordination module 320 can use the received action predictive data to predict one or more actions for the vehicles. The predicted actions can be compared to the one or more vehicle capability parameters, in choosing the one or more selected vehicles.

The coordination module 320 can further include instructions to form one or more data acquisition networks using the one or more selected vehicles. Data acquisition networks can be formed over a variety of networks and/or network types, such as non-hierarchical networks (e.g., mesh networks) and/or hierarchical networks (e.g., local area networks (LAN)). The data acquisition networks can operate based on a variety of protocols (e.g., TCP/IP, UDP, etc.). In further implementations, the coordination module 320 can request the selected vehicles to form the data acquisition network (e.g., network connections established by request but without direct involvement from the coordination module 320). In one or more implementations, the selected vehicles can include one or more systems or devices capable of forming a network on request. As such, the coordination module 320 can include instructions to request the formation of the data acquisition network using the systems or devices. In one or more further implementations, the data acquisition network can use an encryption scheme for the transmission of data between one or more vehicles in the data acquisition network. In one or more further implementations, the vehicles in the data acquisition network can be dynamic, including vehicle selected for short-term and/or vehicle selected for a specific purpose. In further implementations, the data acquisition network can coordinate the collection, processing, and transmission of the sensor data. The selected vehicles, the grouping, the organization, and/or the dynamics of the data acquisition network, as well as related information, can be stored as part of the collection information 360, as shown in the database 310.

The prediction module 330 can generally include instructions that function to control the processor 204 to receive and/or collect sensor data from the one or more data acquisition networks. In one or more implementations, the data acquisition networks can collect sensor data about the vehicular environment. The prediction module 330 can further collect the sensor data through one or more sensors operatively connected with the one or more selected vehicles. In some implementations, the prediction module 330 can collect the sensor data through instructions from the prediction module 330. In some examples, the prediction module 330 can provide instructions to the selected vehicles to collect the sensor data. In further examples, the one or more selected vehicles can provide sensor data impromptu to the prediction module 330 as part of the one or more data acquisition networks.

The sensor data can include data as derived from one or more explicit sensors and/or one or more implicit sensors. Explicit sensors, as used herein, relates to one or more devices or systems which are designed to collect data. Examples of explicit sensors can include RADAR, LIDAR, barometers, thermostats/thermocouples, or others capable of detecting one or more parameters of climate or weather as appropriate for and/or as adaptable for the one or more selected vehicles. Implicit sensors, as used herein, relates to one or more devices or system from which data can be extrapolated. "Implicit sensors" generally includes any device and/or system which can, by the nature, configuration, and/or utilization of the device and/or system, provide information and/or data about a detectable event. The information and/or data from the implicit sensors can be derived from or based on observation and/or understanding of the activity, function, or use. In one or more examples, implicit sensors can include windshield wipers (e.g., to indicate raining), HVAC systems (e.g., to indicate changes in and degree of temperature), traction control systems (e.g., indicating the presence of ice or moisture), or another system from which data can be extrapolated.

In one or more implementations, the sensor data can be based on one or more detection parameters. In one or more embodiments, detection parameters can include detectable events can include one or more events in a vehicular environment which relate to weather, climate, and/or atmospheric events or anomalies. Detection parameters can include location-based limitations and/or information-based limitations. Examples of location-based limitations can include specific locations, specific location types (e.g., intersections, highways, etc.), related structures (e.g., schools, hospitals, etc.), special event locations (e.g., stadiums, sports arenas, etc.), or other parameters which modify the detection based on specific portions of the vehicular environment. Examples of detection information-based limitations can include specific data types (e.g., precipitation, temperature, etc.), specific weather events (e.g., rain, snow, hail, etc.), vehicle responses to weather events (e.g., moving to the side of the road in response to reduce visibility), use of explicit/implicit sensors, or other parameters which modify the detection based on specific types of information received. The sensor data can be stored as part of the prediction data 370, shown in the database 310.

The prediction module 330 can further include instructions to predict one or more weather conditions using the sensor data. The weather conditions can include any event and/or anomaly related to atmospheric conditions, such as a weather event which affects the vehicular environment. In one or more implementations, the weather conditions can be predicted as a group of conditions or individual conditions, as desired. The prediction module 330 can further extract the prediction of the group of weather conditions from a smaller group or a single predicted weather condition. For example, a prediction of snow can be treated as a prediction of a single weather condition, as well as extrapolated to a group of weather conditions including icy roads, reduced visibility, and obscured signage. In further embodiments, the predicted weather conditions can include information about current and future positions, changes in the weather event that are expected, interrelation between weather events as detected by a plurality of data acquisition networks, or other data which speaks to changes or modifications to the one or more weather conditions, as currently predicted.

The prediction module 330 can use one or more available methods for predicting weather. In some implementations, the prediction module 330 can include instructions to perform one or more statistical analyses about the sensor data in predicting the weather conditions. The statistical analyses used herein can include traditional statistics (e.g., weather patterns and modeling) and well as cross-field statistical approaches. Examples of statistical methods which can be beneficially incorporated in the implementations described herein include extrapolation (e.g., weather pattern or soil moisture modeling), interpolation, averaging, perfect prog regression, hyperlocal forecasting, model output statistics (MOS) and others). In yet further implementations, historical weather patterns can be taken into account. The systems and methods described herein are not intended to be limited by any specific example or approach for weather modeling. As such, the systems and methods described herein can use any weather prediction model, system, or algorithm now known or later developed.

In further implementations, the sensor data can be correlated between a plurality of the selected vehicles to predict weather conditions. In some implementations, the prediction module 330 can increase the precision of the prediction of weather conditions by using the sensor data from a plurality of vehicles. In further implementations, the prediction module 330 can utilize the sensor data received from one or more vehicles to isolate and/or exclude sensor data from a selected vehicle, such as when the sensor data is determined not to be reliable and/or trustworthy. In light of this, the prediction module 330 can further include instructions to corroborate the sensor data, such as in making predictions about the one or more weather conditions.

In some implementations, the prediction module 330 can corroborate the sensor data from explicit sensors using sensor data from implicit sensors. In one example, the prediction module 330 can determine that the sensor data from a set of explicit sensors, such as barometric pressure and/or atmospheric moisture, that the vehicular environment is dry. However, in the same example where windshield wipers are used as implicit sensors, the prediction module 330 can determine that the sensor data received from the implicit sensors indicates rain in the vehicular environment (e.g., 90% of windshield wipers are moving in a fashion, rate, and timeframe that would indicate that it is generally raining in the area). In this case, the prediction module 330 can determine that the explicit sensors are not corroborated, as the implicit sensors (the windshield wipers) generally indicate that the explicit sensors are incorrect. As such, the prediction module 330 can corroborate sensor data from explicit sensors using human behavior or other events as measured from implicit sensors.

The prediction module 330 can include instructions which function to control the processor(s) 204 to integrate the sensor data received from and/or in operative connection with the one or more data acquisition networks. The sensor data, as well as metadata about the sensor data, can allow for a variety of weather predictions. The sensor data can provide information about both current and expected weather conditions. The prediction module 330 can apply the sensor data in light of positional information about the selected vehicle, such as the location, speed, and path of the selected vehicle. The prediction module 330 can collect the sensor data in a coordinated fashion, such that groupings of vehicles collect separate but related sensor data towards the overall goal of predicting one or more weather conditions. The one or more predicted weather conditions and/or information related to the one or more weather conditions can be stored as part of the weather information 380, shown in the database 310.

The response module 340 can generally include instructions that function to control the processor 204 to update one or more environmental elements in response to the predicted weather conditions. The one or more environmental elements generally relate to elements of the vehicular environment which can be affected by our generally relate to the predicted weather conditions. Environmental elements can include one or more elements of a map which relate to weather data or can be used to orient a weather condition to the vehicular environment, a vehicle route/navigation, vehicle advice, travel time estimates, etc. Examples of updating the environmental elements can include updating a weather map with the weather condition, updating a vehicle route in response to the weather condition, providing advice based on one or more vehicle limitations, updating travel time estimates, updating control system recommendations, (e.g., use of four-wheel-drive, changes in maneuverability choices, etc.), or combinations thereof. The response module 340 can include instructions to access available map data, such as the map data 116, including the terrain map 117 and the static obstacle map 118. The response module 340 can determine if there is any available information in relation to the one or more predicted weather conditions. The response module 340 can determine that the map data 116, or components thereof, can be updated in relation to the one or more predicted weather events. The response module 340 can associate the predicted weather conditions with the map data 116, or components thereof. The response module 340 can form the associations based on a variety of factors, such as based on location, as well as temporal changes that are expected or anticipated for the predicted weather conditions.

The response module 340 can further include instructions to control an autonomous driving module for one or more recipient vehicles in response to the updated environmental elements. In further implementations, the response module 340, or components thereof, can provide instructions for control or navigation of one or more recipient vehicles. In one or more implementations, the recipient vehicles can be substantially similar to the vehicle 100, described with reference to FIG. 1. One or more recipient vehicles can include an autonomous driving module, such as the autonomous driving module 160 described with reference to FIG. 1. In some implementations, the response module 340 can provide instructions which control of the one or more recipient vehicles (e.g., direct control of the recipient vehicle). In further implementations, the response module 340 can provide instructions which are converted to control instructions by the one or more recipient vehicles (e.g., indirect control the recipient vehicle).

In one or more further implementations, the reporting module 340 can further include instructions to transmit the sensor data to a lead vehicle in the data acquisition network. The collaborative forecasting system 170 can generally be distributed throughout and beyond the data acquisition network, including having the collaborative forecasting system 170, or modules thereof, as part of the one or more selected vehicles. In some implementations, the response module 340 can further include instructions to redirect one or more portions of the sensor data towards a specific vehicle of the selected vehicles, also referred to as the lead vehicle. In one or more implementations, collaborative forecasting system 170 can cause the lead vehicle to receive and process the sensor data. The collaborative forecasting system 170 can then forward the sensor data to a remote source, in either a raw or processed format, or otherwise control the flow of information and/or data within the data acquisition network. The lead vehicle can be an otherwise equal member of the data acquisition network. As such, a data acquisition network with a non-hierarchical network structure can include a lead vehicle.

Figure 4:
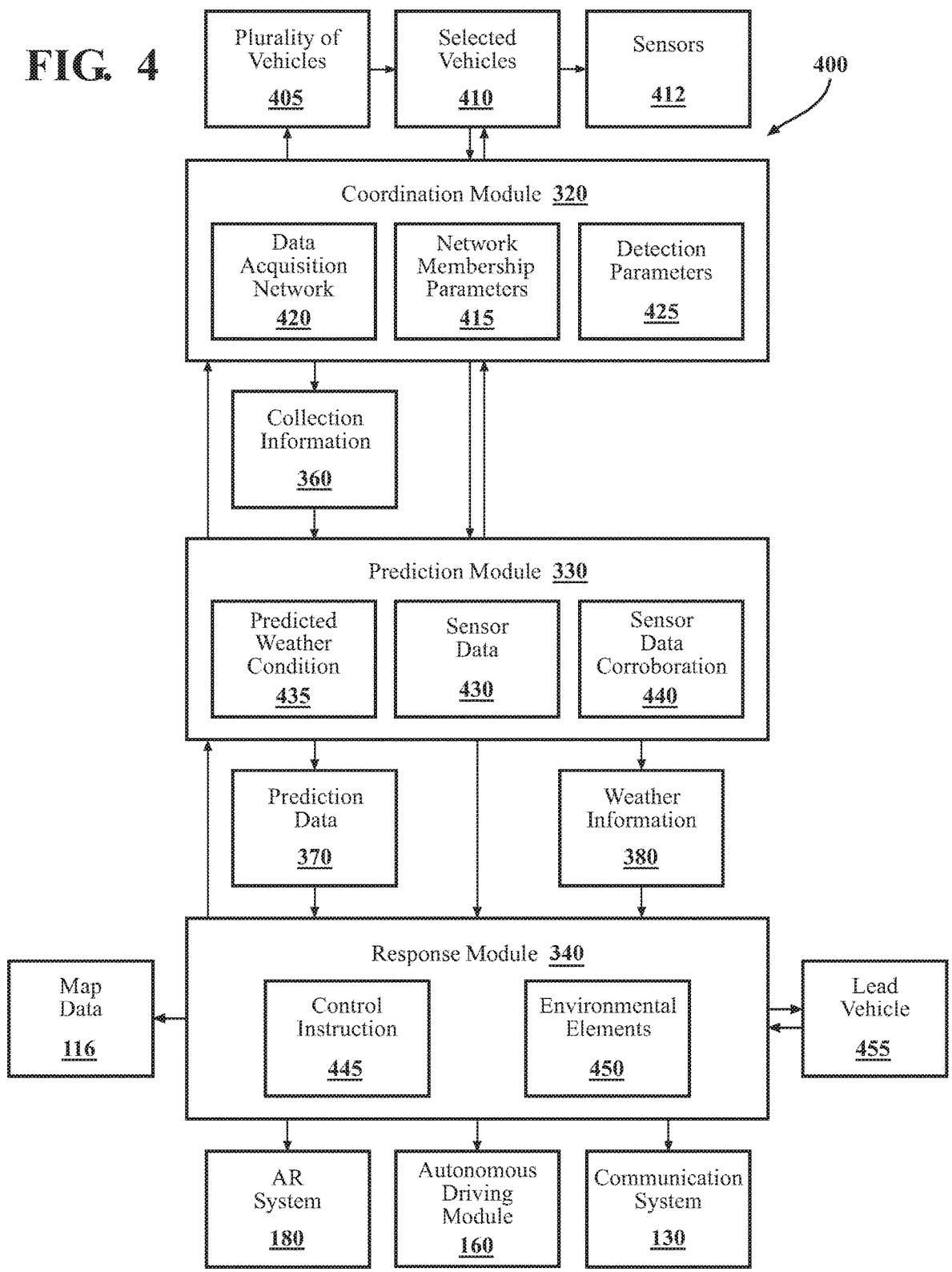
FIG. 4 is a schematic of the collaborative forecasting system, according to one or more implementations.

FIG. 4 is a schematic 400 of the collaborative forecasting system 170, according to one or more implementations. The collaborative forecasting system 170 can be configured to form one or more data acquisition networks using one or more selected vehicles, collect sensor data related to weather, predict one or more weather conditions, and forward one or more control instructions with relation to the weather conditions. Thus the collaborative forecasting system 170 is capable of crowdsourcing weather information between one or more disparate vehicles forming the one or more data acquisition networks. By collecting the sensor data with relation to the data acquisition network, the collaborative forecasting system 170 can better profile local weather conditions by correlating and grouping vehicle level capabilities and sensor data type for vehicle capability, while accounting for vehicle location and proximity.

The schematic 400 includes the plurality of vehicles 405. The plurality of vehicles 405 can include vehicles available within range of the collaborative forecasting system 170, portions thereof, and/or subgroups thereof. The plurality of vehicles 405 can be vehicles capable of communication with one or more networks, such as the network 190. The coordination module 320 can include instructions to interact with the plurality of vehicles 405 to select one or more selected vehicles 410. The selected vehicles 410 can be one or more vehicles selected from the plurality of vehicles 405 based on one or more network membership parameters 415. The network membership parameters 415 can relate to the capacities and capabilities of the selected vehicles 410, such that the selected vehicles 410 are capable of collecting the desired sensor data, are located in a desired geographic location, and/or have other desired attributes.

Once the coordination module 320 has selected the selected vehicles 410, the selected vehicles 410 can be grouped into one or more data acquisition networks 420. The data acquisition network 420 is a network created between the one or more selected vehicles 410 which allows for communication between the selected vehicles 410 and fulfillment of the one or more detection parameters 425. Further, the data acquisition network 420 can be used to coordinate the data collection, such as to avoid duplicitous data collection between the one or more selected vehicles 410 and/or to corroborate the data. The detection parameters 425 can include one or more desired elements for sensor data 430, as collected by the selected vehicles 410 through the data acquisition network 420. The detection parameters 425 can be substantially similar to the detection parameters, described with reference to FIG. 3.

In one or more implementations, the data acquisition network 420 can allow communication of sensor data 430 between the selected vehicles 410. Communication of the sensor data 430 between the selected vehicles 410 can serve a number of goals, including internal corroboration of data, conserving bandwidth, allowing for the preprocessing of data, reducing duplicitous transmissions, and others which can allow a more efficient use of remote communication capabilities and resources. The identification of the selected vehicles 410 as connected through the data acquisition network 420, the network membership parameters 415, and/or the detection parameters 425 can be stored as part of the collection information 360, described with reference to FIG. 3. The coordination module 320 can then forward or make available the collection information 360 to the prediction module 330.

The prediction module 330 can include instructions to collect the sensor data 430 through the one or more sensors 412 of the selected vehicles 410. The sensors 412 can be substantially similar to the one or more sensors, described with reference to the one or more selected vehicles in FIG. 3. The sensors 412, as above, can include explicit sensors and/or implicit sensors. The selected vehicles 410 can then use the sensors 412 to collect the sensor data 430 in light of the detection parameters 425.

The prediction module 330 can then use the sensor data 430, either in a raw or processed format, for the one or more predicted weather conditions 435. The predicted weather conditions 435 can be one or more predictions related to one or more weather events which can be detected and/or determined with use of the sensor data 430. The predicted weather conditions 435 can be substantially similar to the one or more predicted weather conditions, described with reference to FIG. 3. The one or more predicted weather conditions 435 can be related to the vehicular environment where the selected vehicles 410 collect the sensor data 430. In further implementations, the predicted weather conditions 435 can relate to a related vehicular environment, a nearby vehicular environment, or others as can be extrapolated from the sensor data 430.

The prediction module 330 can further include instructions to communicate with the one or more selected vehicles 410, such as to create and/or provide the sensor data corroboration 440. The sensor data corroboration 440 can include one or more comparisons between one or more data types as derived from the sensor data 430 to verify the sensor data 430 as received from the selected vehicles 410. The sensor data corroboration 440 can include comparisons between each of the selected vehicles 410, comparisons between the selected vehicles 410 and one or more of the plurality of vehicles 405, comparisons between different data types derived from implicit and explicit sensors of the sensors 412, or others which tend to verify the data as received in the sensor data 430. The sensor data 430, along with any metadata about the sensor data 430, and the sensor data corroboration 440 can be stored as part of the prediction data 370, described with reference to FIG. 3. The sensors 412 and related information can be stored as part of the weather information 380, described with reference to FIG. 3. The prediction data 370 in the weather information 380 can be stored as part of the database and made available to the response module 340.

The response module 340 can include instructions to update one or more environmental elements 450. The environmental elements 450 can be substantially similar to the environmental elements, described with reference to FIG. 3. The environmental elements 450 can be stored as part of the map data 116, described with reference to the vehicle 100 in FIG. 1. The environmental elements 450 can include one or more components which can be affected and/or changed by weather conditions. The environmental elements 450 can include maps or individual elements (e.g., roads, routes, ranges, descriptors, or other components) of the map. The environmental elements 450 can be updated to reflect changes based on the one or more sensors 412, such as changes in drivability, changes in timing for the route, interactions between weather conditions (e.g., rain followed by cold weather leading to black ice), and others. The environmental elements 450 can be updated using the one or more sensors 412 to reflect timing and/or intensity of the one or more sensors 412.

In one or more further implementations, the response module 340 can include instructions to provide one or more control instructions 445 to the selected vehicles 410. The control instructions 445 can include instructions which, when received by the autonomous driving module(s) 160, can control or instruct for control the one or more selected vehicles 410. In one or more implementations, the control instructions 445 can be delivered through the network 190 to the selected vehicles 410. In one or more further implementations, the autonomous driving module(s) 160 and the collaborative forecasting system 170 can be integrated as part of the same system. Thus, the collaborative forecasting system 170 can transmit or otherwise deliver the control instructions 445 directly to the autonomous driving module(s) 160. In some implementations, the autonomous driving module(s) 160 can use the control instructions 445 to control each of the one or more selected vehicles 410. In further implementations, the autonomous driving module(s) 160 can use the control instructions 445 as guidance to prepare autonomous control instructions for the one or more selected vehicles 410. In one or more implementations, the response module 340 can be configured to provide information, data, instructions, and/or commands to a lead vehicle 455. The lead vehicle 455 can provide information, data, instructions, and/or commands to the response module 340 and/or other element of the collaborative forecasting system 170.

The collaborative forecasting system 170 can thus organize and coordinate one or more vehicles for the purpose of crowdsourced weather prediction. The collaborative forecasting system 170, as described above, can use one or more modules to create a data acquisition network from a group of selected vehicles, collect sensor data through the data acquisition network, and predict one or more weather conditions in light of the receive sensor data. The collaborative forecasting system 170 can organize disparate sensor systems from a variety of vehicles to crowdsource local weather conditions. Further, the collaborative forecasting system 170 can provide guidance through control instructions based on the sensor data and the predicted weather conditions. Thus, the collaborative forecasting system 170, through updated local weather data, can increase road safety, better control the occurrence of hazardous conditions, and assist in the avoidance of the hazardous conditions, as created by inclement weather.

Figure 5:
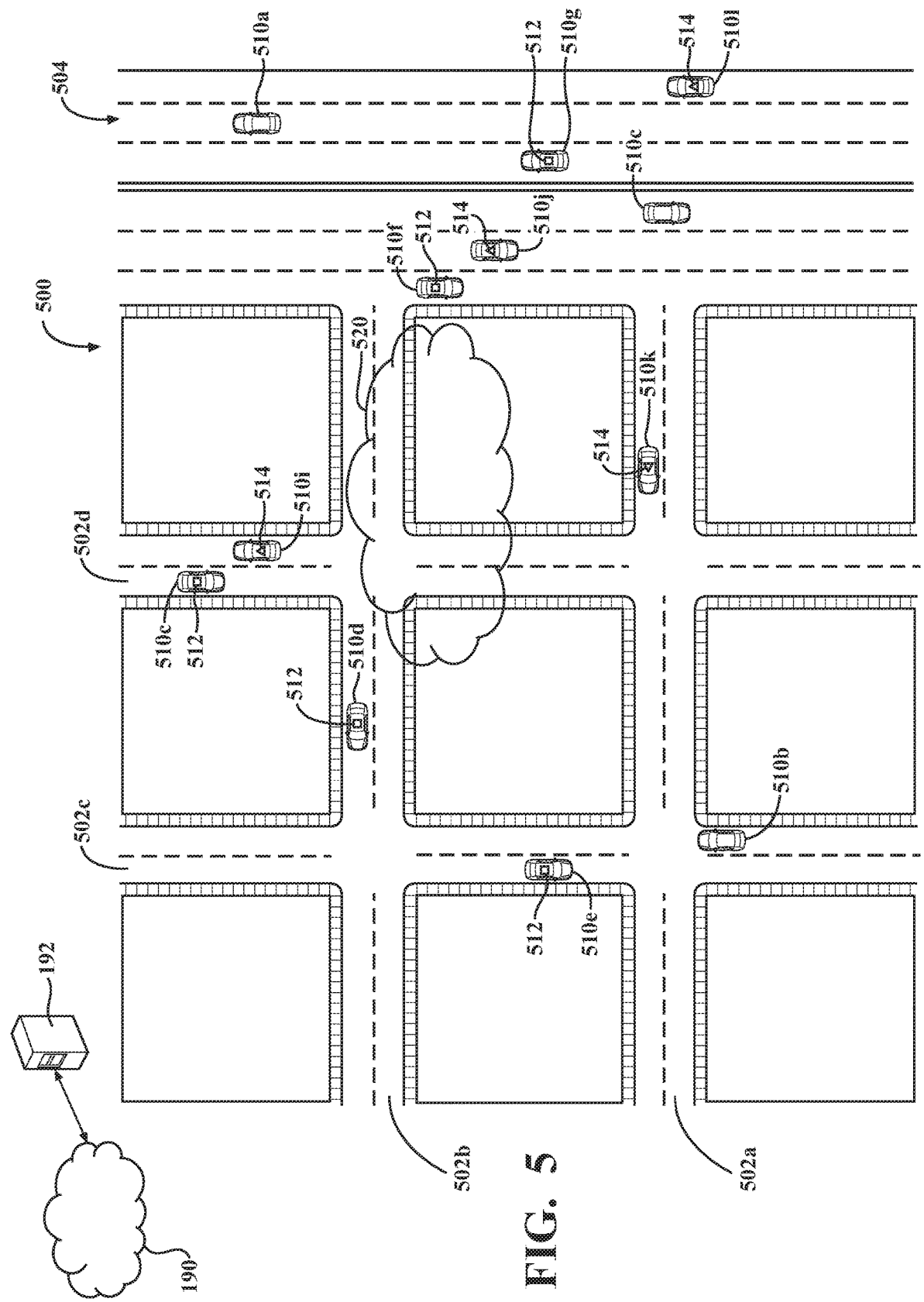
FIG. 5 is a depiction of a plurality of vehicles incorporating the collaborative forecasting system in a vehicular environment, according to one or more implementations.
Figure 6:
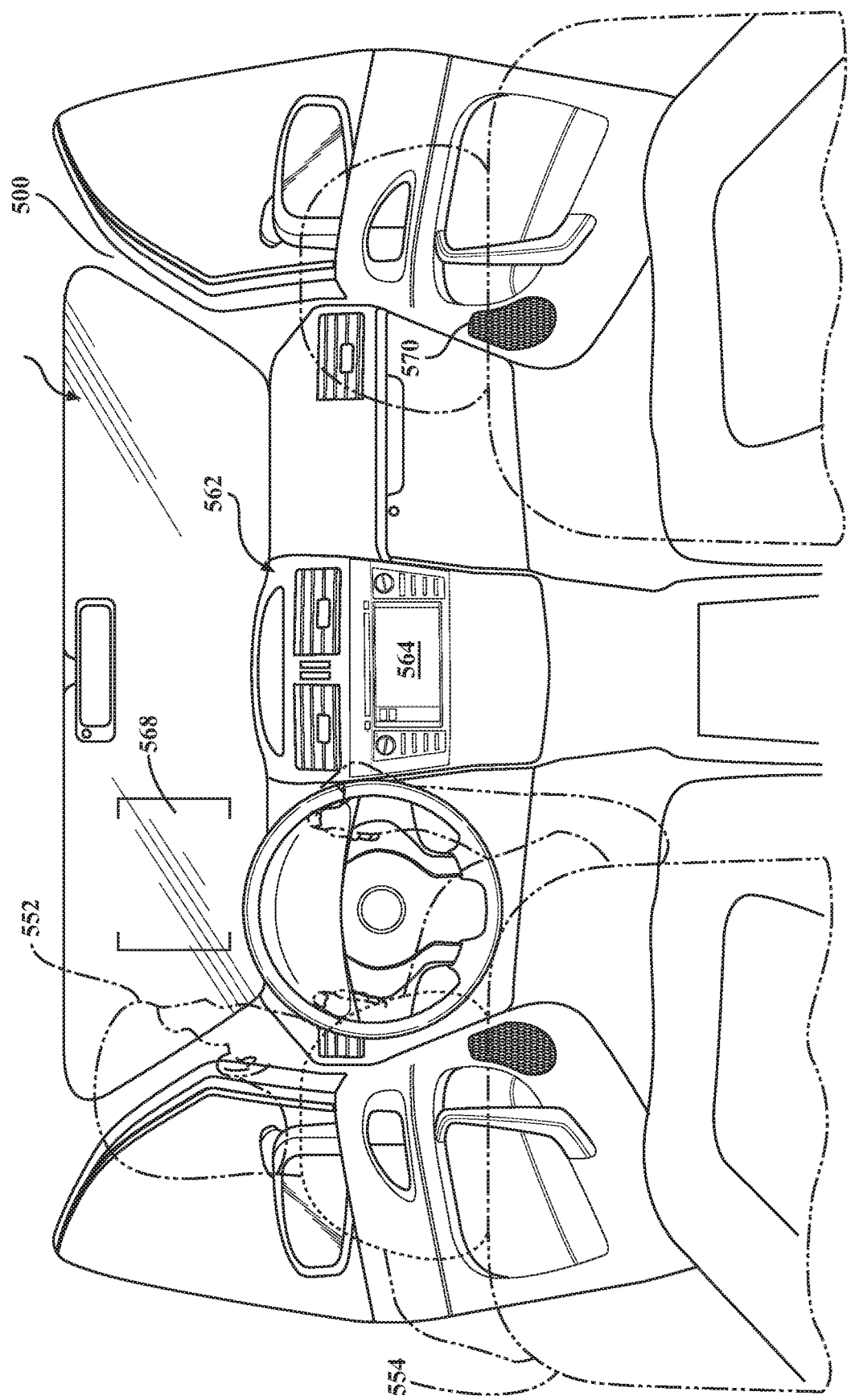
FIG. 6 shows an example of an interior of a vehicle that includes a collaborative forecasting system, according to one or more implementations.

FIGS. 5 and 6 are depictions of some examples of the collaborative forecasting system 170 as part of a vehicular environment. FIG. 5 is an overhead depiction of a plurality of vehicles 510a-510l in a vehicular environment 500, according to one or more implementations. The vehicular environment 500 can include a plurality of roads 502. The roads 502 can be one or more roads or thoroughfares capable of supporting vehicle ingress and egress, as used in one or more rural or urban vehicular environments. Some of the he roads 502a-502d can abut or be adjacent to a highway 504. The highway 504 can be a highway and/or another major thoroughfare capable of supporting traffic at higher speeds. The highway 504 is shown as being elevated above the roads 502. However, this is not intended to be limiting of possible vehicular environments, or components thereof.

The plurality of vehicles 510a-510l can include one or more sensor systems, such as the first sensor system 512 and the second sensor system 514. The first sensor system 512 and the second sensor system 514 can be substantially similar to the sensor system 120, described with reference to FIG. 1. In some implementations, the vehicles 510a-510l can be without a standard sensor system (i.e., vehicles with no extrinsic sensors), such as the vehicles 510a-510c, as depicted throughout the vehicular environment 500. In some implementations, the first sensor system 512 can be incorporated as part of the plurality of vehicles, such as incorporated into the vehicles 510d-510h. In yet further implementations, the second sensor system 514 can be incorporated as part of the plurality of vehicles, such as incorporated into the vehicles 510i-510l. In some implementations the first sensor system 512 can include one or more independent or distinct components from the second sensor system 514.

The plurality of vehicles 510a-510l can be dispersed throughout the vehicular environment 500. In some examples, a portion of the plurality of vehicles can be located on the highway 504, such as the vehicles 510a, 510c, 510f, 510g, 510j, and 510l and shown as moving in both directions on the highway 504. In further examples, a portion of the plurality of vehicles can be located on the roads 502a-510d, such as the vehicles 510b, 510b, 510c, 510d, 510h, and 510i.

In one or more implementations, the collaborative forecasting system 170 can be stored in one or more storage locations, such as part of one or more of the vehicles 510a-510l, as part of the server 192, as part of a remote source, an edge computing system, or combinations thereof. In some examples, the coordination module 320 can select one or more of the vehicles 510a-510l. The selected vehicles of the vehicles 510a-510l can be selected based on the network membership parameters. The network membership parameters can include vehicle capability parameters, which can include collection of specific data types, specific reliability levels, age of the vehicle, availability of specific sensors, other factors, or combinations thereof. The membership parameters can include location-based factors, such as such as proximity to one another and/or proximity to a location where sensor data is desired (e.g., a detection region 520). Here, the collaborative forecasting system 170, using the coordination module 320, can select vehicles which both incorporate the second sensor system 514 and are within a specific range of the detection region 520. In some examples, the collaborative forecasting system 170 can select the vehicles 510i, 510j, and 510k as the selected vehicles for the data acquisition network.

The collaborative forecasting system 170 can connect the vehicles 510i, 510j, and 510k to one another, as part of the data acquisition network. In some implementations, the vehicles 510i, 510j, and 510k can be connected directly to one another such as being part of a mesh network. In further implementations, the vehicles 510i, 510j, and 510k can be connected through a standard network, such as a LAN or wide area network (WAN). The vehicles 510i, 510j, and 510k can further receive instructions from the collaborative forecasting system 170 regarding the type of data to be collected, such as the detection parameters. The instructions from the collaborative forecasting system 170 can include the vehicles 510i, 510j, and 510k all collecting the same data, collecting different data, collecting specific datatypes, collecting data in sequence, or others based on the desires the collaborative forecasting system 170 with regards to predicting weather conditions.

In some examples, the collaborative forecasting system 170 can, such as through the prediction module 330, determine that further data is desired with regards to barometric pressure in the detection region 520. In this case, the collaborative forecasting system 170 can instruct the vehicles 510*i*, 510*j*, and 510*k* to collect barometric pressure data using the second sensor system 514. The prediction module 330 can collect and/or receive sensor data from the vehicles 510*i*, 510*j*, and 510*k*. In some implementations, the prediction module 330 can directly collect the sensor data through the vehicles 510*i*, 510*j*, and 510*k*. In further implementations, the prediction module 330 can receive the sensor data as collected by one or more systems of the vehicles 510*i*, 510*j*, and 510*k*.

In yet further implementations, the received sensor data can be corroborated against sensor data and/or information received from one or more of the vehicles 510*a*-510*h*, and 510*l*. The sensor data can be from the same type of sensors, such as from the vehicle 510*l*, or from different sensors, such as from the vehicles 510*d*-510*h*. In further implementations, the extrinsic sensor data from the vehicles 510*i*, 510*j*, and 510*k* can be corroborated by intrinsic sensor data, such as from the vehicles 510*a*, 510*b*, and 510*c*. In this example, the extrinsic and intrinsic sensor data received from the vehicles 510*a*-510*h*, and 510*l* either corroborates or does not refute the sensor data as received from vehicles 510*i*, 510*j*, and 510*k*. As such, the prediction module 330 can consider the sensor data received from the vehicles 510*i*, 510*j*, and 510*k* as reliable.

In one or more implementations, the prediction module 330 can receive the sensor data in either a raw or processed format from the vehicles 510*i*, 510*j*, and 510*k*. In some examples, a lead vehicle can be selected from the vehicles 510*i*, 510*j*, and 510*k*, such as the vehicle 510*k*. In this example, the vehicle 510*k* can receive all sensor data or portions thereof from the vehicles 510*i* and 510*j*. The vehicle 510*k* can process the sensor data and/or forward the sensor data in a raw format to the prediction module 330. The prediction module 330 can make one or more predictions about weather conditions in relation to the received sensor data. In this case, the prediction module 330 can include instructions to predict, based on a lowering of barometric pressure in the detection region 520, that rain is a potential weather condition for this region.

FIG. 6 depicts the interior of a recipient vehicle 550 incorporating the collaborative forecasting system 170, according to one or more implementations. The recipient vehicle 550 can be substantially similar to the vehicle 100, described with reference to FIG. 1. The recipient vehicle 550 can be, for example, one or more of the plurality of vehicles 510*a*-510*l* in FIG. 5, or it can be a separate vehicle. The recipient vehicle 550 can include one or more occupants, such as an occupant 552 sitting in a driver seat 554. The recipient vehicle 550 can further include a device console 562. The device console 562 can further include a console display 564. In one or more implementations, the console display 564 can be a touch responsive display or otherwise capable of receiving input from the occupant 552. The recipient vehicle 550 can further include a windshield 566. In some implementations, the windshield 566 can include an augmented reality (AR) display 568.

The recipient vehicle 550 can, through the collaborative forecasting system 170, receive the one or more predicted weather conditions. In some implementations, the collaborative forecasting system 170, using instructions from the response module 340, can forward control instructions to the recipient vehicle 550. The control instructions can include a new route to avoid the one or more predicted weather conditions, guidance to one or more modules of the recipient vehicle 550 to better regulate traction based on the predicted weather conditions, or others. The collaborative forecasting system 170 provide instructions to the recipient vehicle 550 by directly controlling the recipient vehicle 550 (e.g., instructions to the autonomous driving module(s) 160). In further implementations, the collaborative forecasting system 170 can provide information to the autonomous driving module(s) 160, such that the autonomous driving module(s) 160 can formulate control instructions for the recipient vehicle 550.

In further implementations, the collaborative forecasting system 170 can provide information to the occupant 552 regarding the one or more predicted weather conditions and/or real-time weather conditions in a micro-location (such as a location along the current travel path of the vehicle). In some implementations, the collaborative forecasting system 170 can display information about the one or more predicted weather conditions to the occupant 552 through the console display 564 and/or the AR display 568. In further implementations, information about the one or more predicted weather conditions can be delivered in an audio format, such as from the collaborative forecasting system 170 through the speakers 570 to the occupant 552.

Thus the collaborative forecasting system 170 can provide numerous benefits the plurality of vehicles 510 in the vehicular environment 500. The collaborative forecasting system 170 can reliably control the collection of sensor data, through the use of selected vehicles in a data acquisition network. Further, vehicles outside the network can be used to corroborate data received through the data acquisition network. The collaborative forecasting system 170 can use the sensor data to predict one or more weather conditions. The predictions can be forwarded by the collaborative forecasting system 170 and the other information or instructions to a vehicle, such as the recipient vehicle 550. In this way, the collaborative forecasting system 170 can assist both autonomous vehicles and human vehicle operators in avoiding or navigating through changing weather conditions in a vehicular environment. The collaborative forecasting system 170 can facilitate the efficient processing of sensor data among a network of vehicles.

Now that the various potential systems, devices, elements and/or components have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 7:
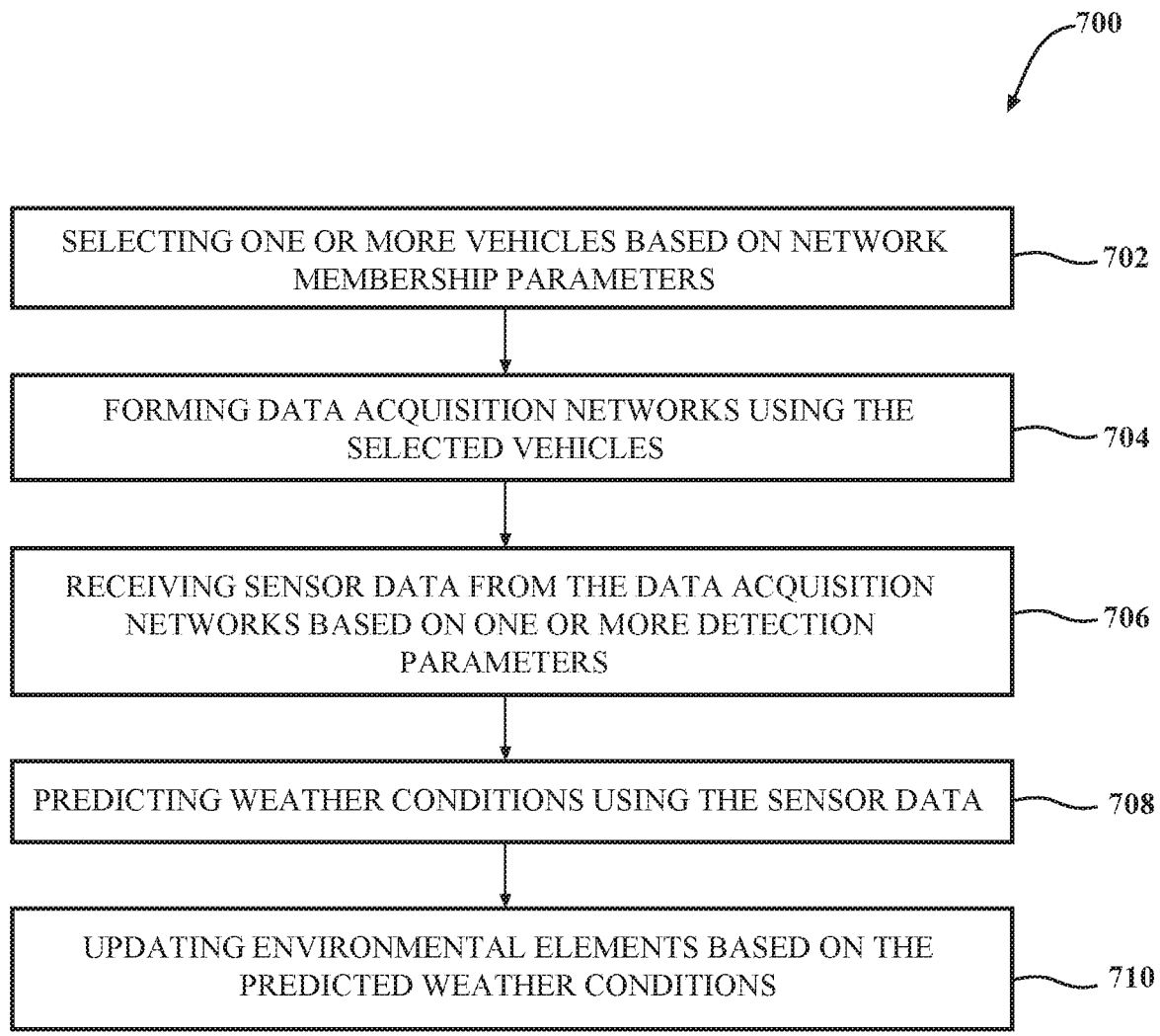
FIG. 7 is a flow diagram of a method for vehicle-based weather detection, according to one or more implementations.

FIG. 7 is a flow diagram of a method 600 for vehicle-based weather prediction, according to one or more implementations. The method 600 can include selecting one or more vehicles from a plurality of vehicles in response to one or more vehicle capability parameters, at 602. One or more data acquisition networks can be formed using the one or more selected vehicles, at 604. Sensor data can be received from the one or more data acquisition networks. The sensor data can be based on one or more detection parameters, at 606. One or more weather conditions can be predicted using the sensor data, at 608. One or more environmental elements (e.g., maps, etc.) can be updated in response to the predicted weather conditions, at 610. Thus, the method 600 can provide a variety of benefits for vehicle navigation with relation to changing weather patterns. The method 600 is described in greater detail below.

The method 600 can include selecting one or more vehicles from a plurality of vehicles in response to one or more network membership parameters, at 602. The network membership parameters can include vehicle capability parameters, including vehicle capability parameters that are substantially similar to the vehicle capability parameters, described with reference to FIG. 3. The network membership parameters can be used to guide the selection of appropriate vehicles for the purposes of a data acquisition network. The network membership parameters can be used by the method 600 to inform the selection of the selected vehicles for the data acquisition network. The groups of selected vehicles and the related data acquisition networks can be selected to perform different roles within the same or different vehicular environment. The groups of selected vehicles can, thus, perform distinct roles with relation to the collection of sensor data.

The selected vehicles can be selected from a plurality of vehicles. The plurality of vehicles can be all available vehicles or a selection therefrom, such as vehicles within a specific range. The method 600 can receive information from the plurality of vehicles, with relation to capabilities and location of each of the plurality of vehicles. The method 600 can determine which of the plurality of vehicles is appropriate or capable in light of the one or more vehicle capability parameters. In further implementations, the method 600 can include a selection of vehicles from the plurality of vehicles based on historical interaction with the vehicle(s). The selection can include reviewing the reliability and/or capability of one or more of the plurality of vehicles, based on the vehicles previous ability to provide sensor data.

The vehicle capability parameters can further include planned actions for each of the plurality of vehicles. In one or more implementations, one or more of the plurality of vehicles can have a speed or route which makes the selection of the vehicle not desirable. In some implementations, the method 600 can provide a communication to one or more of the plurality of vehicles which indicates a desired selection of the vehicle. The communication can further include a request for action predictive data. The action predictive data can indicate route, speed, or other factors which may affect the timing and/or occurrence of a specific vehicle position. A related communication can further be provided to one or more alternate vehicles of the plurality of vehicles. The predicted actions can be compared by the method 600 to the planned actions, as stored in the one or more vehicle capability parameters, in choosing the one or more selected vehicles.

In one or more implementations, the selection of one or more selected vehicles can be included as part of a system, such as the collaborative forecasting system 170 described with reference to FIG. 3. The collaborative forecasting system 170 can include the coordination module 320. The coordination module 320 can generally include instructions that function to control the processor 204 to select one or more vehicles from a plurality of vehicles having one or more vehicle capability parameters. In one or more embodiments, the collaborative forecasting system 170 receives or determines vehicle capability parameters based on desired information for weather prediction. The coordination module 320 can further include instructions to identify vehicles for the desired sensor data. The selection and sensor data can be stored as part of the collection information 360, as shown in the database 310 and described with reference to FIG. 3.

One or more data acquisition networks can be formed using the one or more selected vehicles, at 604. The data acquisition networks can be substantially similar to the data acquisition networks described with reference to FIG. 3. Data acquisition networks can be formed over a variety of networks and/or network types and can operate based on a variety of protocols. In one or more further implementations, the data acquisition network can use an encryption scheme for the transmission of data between one or more vehicles in the data acquisition network. Further, the vehicles in the data acquisition network can be dynamic, including vehicle selected for short-term and/or vehicle selected for a specific purpose. In further implementations, the data acquisition network can coordinate the collection, processing, and transmission of the sensor data.

In one or more implementations, the formation of the data acquisition network can be included as part of a system, such as the collaborative forecasting system 170 described with reference to FIG. 3. The collaborative forecasting system 170 can include the coordination module 320. The coordination module 320 can generally include instructions that function to control the processor 204 to form one or more data acquisition networks using the one or more selected vehicles. The selected vehicles can be connected into the data acquisition network directly (e.g., through instructions from the coordination module 320) or indirectly (e.g., through a request from the coordination module 320 to a networking-capable system or device of the selected vehicle). The selected vehicles, the grouping, the organization, and/or the dynamics of the data acquisition network, as well as related information, can be stored as part of the collection information 360, as shown in the database 310.

Sensor data can be received from the one or more data acquisition networks, the sensor data being responsive to one or more detection parameters, at 606. In one or more implementations, the data acquisition networks can collect sensor data about the vehicular environment. The sensor data can be substantially similar to the sensor data, described with reference to FIG. 3. The sensor data can be collected through one or more sensors operatively connected with the one or more selected vehicles. The sensor data can include data as derived from one or more explicit sensors and/or one or more implicit sensors. In further implementations, the sensor data can be responsive to one or more detection parameters. Detection parameters, as used herein, generally relate to types, categories, and or amounts of data and/or information for use in making determinations about one or more detectable events. Detection parameters can be substantially similar to detection parameters as described with reference to FIG. 3. Detection parameters can include location-based limitations and/or information-based limitations, such as specific locations, specific location types, related structures, special event locations, specific data types, specific weather events, vehicle responses to weather events, use of explicit/implicit sensors, or others.

In one or more implementations, the collection or receipt of the sensor data can be included as part of a system, such as the collaborative forecasting system 170 described with reference to FIG. 3. The collaborative forecasting system 170 can include the prediction module 330. The prediction module 330 can generally include instructions that function to control the processor 204 to receive and/or collect sensor data from the one or more data acquisition networks. In one or more embodiments, the collaborative forecasting system 170 receives or collects sensor data based on or in light of the detection parameters from the selected vehicles. The sensor data can be stored as part of the prediction data 370, shown in the database 310.

One or more weather conditions can be predicted using the sensor data, at 608. The weather conditions can be any event and/or anomaly related to atmospheric conditions, such as a weather event which affects the vehicular environment. The weather conditions, and components thereof, can be substantially similar to the weather conditions described with reference to FIG. 3. The weather conditions can be predicted as a group of conditions or individual conditions, and can be extracted from a smaller group or a single predicted weather condition. In further embodiments, the predicted weather conditions can include information about current and future positions, changes in the weather event that are expected, the interrelation between weather events as detected by a plurality of data acquisition networks, or others. In further implementations, the sensor data can be correlated between a plurality of the selected vehicles to predict weather conditions. The weather conditions cannot be predicted from the sensor data received by a single vehicle and may be reviewed for reliability and/or trustworthiness. In light of this, the prediction module 330 can further include instructions to corroborate the sensor data, such as in making predictions about the one or more weather conditions. In some implementations, the sensor data from explicit sensors can be corroborated using sensor data from implicit sensors. In further implementations, the method 600 can corroborate sensor data from explicit sensors using human behavior or other events as measured from implicit sensors.

The sensor data, as well as metadata about the sensor data, can allow for a variety of weather predictions. The sensor data can provide information about both current and expected weather conditions. The sensor data can be considered in light of positional information about the selected vehicle, such as the location, speed, and path of the selected vehicle. The sensor data can be collected in a coordinated fashion, such that groupings of vehicles collect separate but related sensor data towards the overall goal of predicting one or more weather conditions.

In one or more implementations, the prediction of the weather conditions can be included as part of a system, such as the collaborative forecasting system 170 described with reference to FIG. 3. The collaborative forecasting system 170 can include the prediction module 330. The prediction module 330 can generally include instructions that function to control the processor 204 to predict one or more weather conditions using the sensor data. In one or more embodiments, the collaborative forecasting system 170 reviews the sensor data, as well as the metadata for predictive information which is applied to the prediction of weather conditions. The one or more predicted weather conditions and/or information related to the one or more weather conditions can be stored as part of the weather information 380, shown in the database 310.

The one or more environmental elements can be updated in response to the predicted weather conditions, at 610. Environmental elements can be substantially similar to the environmental elements described with reference to FIG. 3. Examples of the environmental elements can include updating a weather map, updating a vehicle route, providing advice based on one or more vehicle limitations (e.g., providing driving recommendations to a human driver), time estimates, control system recommendations, (e.g., use of four-wheel-drive, changes in maneuverability choices, etc.), or combinations thereof. The one or more environmental elements generally relate to elements of the vehicular environment which can be affected by our generally relate to the predicted weather conditions. The method 600 can access available map data and determine if there is any available information with relation to the one or more predicted weather conditions. The method 600 can update the map data with relation to the one or more predicted weather events. The predicted weather conditions can be associated with the map data, or components thereof, based on location, as well as temporal changes that are expected or anticipated for the predicted weather conditions.

In one or more implementations, the environmental elements can be updated as part of a system, such as the collaborative forecasting system 170 described with reference to FIG. 3. The collaborative forecasting system 170 can include the response module 340. The response module 340 can generally include instructions that function to control the processor 204 to update one or more environmental elements in response to the predicted weather conditions. In one or more embodiments, the collaborative forecasting system 170 can access and update environmental elements of the map data, such as map data 116, using the predicted weather conditions. The response module 340 can determine that the map data 116, or components thereof, can be updated with relation to the one or more predicted weather events. The response module 340 can further include instructions to provide control instructions to a recipient vehicle.

The method 600 can further include control an autonomous driving module for one or more recipient vehicles in response to the updated environmental elements. In further implementations, the method 600 can control or navigate one or more recipient vehicles. In one or more recipient vehicles can be substantially similar the vehicle 100, described with reference to FIG. 1. One or more recipient vehicles can include an autonomous driving module, such as the autonomous driving module 160 described with reference to FIG. 1. In some implementations, the method 600 can directly control of the one or more recipient vehicles. In further implementations, the method 600 can provide instructions which are used to control the one or more recipient vehicles, such as by conversion to control instructions through the autonomous driving module 160.

In one or more further implementations, the method 600 can transmit the sensor data to a lead vehicle in the data acquisition network. In some implementations, the method 600 can redirect one or more portions of the sensor data towards a specific vehicle of the selected vehicles. This vehicle can be referred to as the lead vehicle. In one or more implementations, the lead vehicle can receive the sensor data, process the sensor data, forward the sensor data to a remote source, in either a raw or processed format, (e.g., the server 192) otherwise control the flow of information and/or data within the data acquisition network. The lead vehicle can be an otherwise equal member of the data acquisition network.

FIG. 1 shows an example of a vehicle in which systems and methods disclosed herein may operate. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and/orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The processor(s) 110, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the collaborative forecasting system 270, and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 either independently or in combination with the collaborative forecasting system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

The vehicle 100 can further include an AR system 180. It should be appreciated that the AR system 180 can take many different forms but in general functions to augment or otherwise supplement viewing of objects within a real-world environment surrounding the vehicle. That is, for example, the AR system 180 can overlay graphics using one or more AR displays in order to provide for an appearance that the graphics are integrated with the real-world through, for example, the windshield of the vehicle 100. Thus, the AR system 180 can include displays integrated with the windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real world, modifications of objects in the real world, and/or a combination of the two. In one implementation, at least one AR display of the AR system 180 fuses a real-time image from a camera (e.g., exterior facing camera) of at least part of the surroundings of the vehicle 100 with synthetic objects (e.g., rendered graphical elements) from the AR system 180 and/or the collaborative forecasting system 170. As one example, a monitor (i.e., AR display) is integrated within or just above a dashboard of the vehicle 100 and is controlled to display a fused view of graphical elements rendered by the AR system 180 with real-world images from the camera. In this way, the AR system 180 can augment or otherwise modify a view of an operator/passenger in order to provide an enriched/embellished visual sensory experience.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-7, but the implementations are not limited to the illustrated structure or application.

Referring to FIG. 2, an example of a computing device 200 having the collaborative forecasting system 170 is illustrated. The computing device 200 can be any appropriate type of computing device such as, but not limited to, a server, a personal computer (PC), workstation, embedded computer, or stand-alone device with a computational unit, such as a microprocessor, DSP (digital signal processor), FPGA (field programmable gate array), or ASIC (application-specific integrated circuit). In some implementations, the computing device 200 can be a server connected with a display device 230. While arrangements will be described herein with respect to servers, it will be understood that implementations are not limited to servers. In some implementations, the computing device 200 can be any other form of computing device that, for example, can receive data transmissions from one or more vehicles, send data transmissions to one or more vehicles, and/or can benefit from the functionality of the collaborative forecasting system 170 discussed herein.

The computing device 200 can have an input 202, such as for communication with other computing devices. The input 202 is one or more connections, either wired or wireless, for an input device to the computing device 200. The input 202 can be any suitable communication interface depending on device type and include, but is not limited to, USB (universal serial bus), Lightning, frame grabber, Ethernet, or Firewire. In further implementations, the computing device 200 can include a connection 212. The connection 212, which can be wired or wireless, can allow the computing device 200 to communicate with other computing devices, locally or remotely, such as over a network protocol (e.g., Ethernet or similar protocols). The connection 212 can further be connected with remote devices associated with other computing devices, such as the sensors system 120 and the data store 115 as described with reference to the vehicle 100.

The computing device 200 can further include a processor 204. The processor 204, such as a general purpose processor, can be used for data processing and analysis described herein. The processor 204, which can also be referred to as a central processing unit (CPU), can be a device which is capable of receiving and executing one or more instructions to perform a task as part of a computing device. In one implementation, the processor 204 can include a microprocessor such as an application-specific instruction set processor (ASIP), graphics processing unit (GPU), a physics processing unit (PPU), a DSP, an image processor, a co-processor, or others. Though referenced as the processor 204, it is understood that one or more processors 204 can be used in one or more implementations described herein, including combinations of processors 204. In some implementations, the input 202 can be connected with sensors 218 (e.g., the sensor system 120 of the vehicle 100, sensors available via infrastructure, etc.), microphones or other active or passive input devices or systems.

The computing device 200 can further comprise memory, such as memory 214. The memory 214 can include volatile and/or non-volatile memory. Examples of suitable memory 214 include RAM, flash memory, ROM, PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 214 can be a component of the processor(s) 204, or the memory 214 can be operatively connected to the processor(s) 204 for use thereby. The memory 214 can include one or more modules that include computer-readable instructions that, when executed by the processor 204, cause the processor 204 to perform methods and functions that are discussed herein. The memory 214 can include a database 310, described with reference to FIG. 3. The memory 214 can contain information related to a reference material for comparison and/or analysis purposes. The computing device 200 can also include output connection 216 for conveying output in a fashion which is usable by the vehicle 100, a requesting device, the connected device, and/or a user. In one example, the output connection 216 conveys output to a screen for convenient viewing (e.g., display device 230) or to a control device.

As used herein, the terms "operatively connected" and/or "operative connection" generally refer to any form of connection or association capable of being formed between two or more elements, in light of the functions and/or operations described in the embodiments disclosed herein. In one or more implementations, "operatively connected" can include any form of direct and indirect connections, including connections without direct physical contact. Elements which are described herein as "operatively connected" can, in one or more implementations, be more specifically described as "directly connected", "indirectly connected", "connected", "fluidly connected", "mechanically connected", "electrically connected", "fixably connected", "transiently connected", other forms of connection, or combinations of the above connections, as appropriate for the elements being described. Prepositions such as "to," "with," "between," "in parallel," "in series," or combinations thereof, can be used to further describe the organization of the operative connections described herein or exchanged to discuss alternative implementations. Furthermore, "operatively connected" can include unitary physical structures, that is, structures formed from a single piece of material (e.g., by casting, stamping, machining, three-dimensional printing, etc.). All permutations of operative connections described herein are expressly contemplated for one or more implementations of this disclosure without further explicit recitation herein.

The computing device 200 can further include the collaborative forecasting system 170 or components and/or modules thereof. The collaborative forecasting system 170 can be implemented to perform methods and other functions as disclosed herein. The collaborative forecasting system 170 can include a plurality of modules to perform the functions described herein, such as a coordination module 320, a prediction module 330 and a response module 340. In one or more implementations, the collaborative forecasting system 170 can communicate via a wired or wireless connection, depicted as the network 190, with local or remote devices, such as to receive information regarding the vehicle capability parameters, the one or more selected vehicles of the data acquisition network, sensor data, predicted weather events, or others. In one or more implementations, the collaborative forecasting system 170 can communicate with the vehicle 100, with a server 192, with another computing device 200, or combinations thereof. Further, the collaborative forecasting system 170 can affect communication within the computing device 200, such as between one or more operatively connected devices to correlate occupant identity and functionality as discussed herein. The collaborative forecasting system 170 can be in communication with the one or more vehicles, one or more of which being exemplified by the vehicle 100 as described with reference to FIG. 1, such as to collect weather data, as described herein.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A collaborative forecasting system for vehicle-based weather detection, comprising:
one or more processors; and
a memory communicably coupled to the one or more processors and storing:
a coordination module including instructions that when executed by the one or more processors cause the one or more processors to:
select one or more vehicles based on one or more network membership parameters; and
form one or more data acquisition networks using the one or more selected vehicles;
a prediction module including instructions that when executed by the one or more processors cause the one or more processors to:
receive sensor data from the one or more data acquisition networks based on one or more detection parameters; and
predict one or more weather conditions using the sensor data; and
a response module including instructions that when executed by the one or more processors cause the one or more processors to update one or more environmental elements based on the one or more predicted weather conditions, the environmental elements include at least one of a weather map, a vehicle route, advice based on one or more vehicle limitations, travel time estimates, and control system recommendations.

2. The collaborative forecasting system of claim 1, wherein the response module further comprises instructions to control an autonomous driving module of one or more of the one or more selected vehicles based on the one or more updated environmental elements.

3. The collaborative forecasting system of claim 1, wherein the one or more network membership parameters include at least one of vehicle generation, sensor reliability, and sensor availability.

4. The collaborative forecasting system of claim 1, wherein the prediction module further comprises instructions to transmit the sensor data to a lead vehicle in the one or more data acquisition networks.

5. The collaborative forecasting system of claim 1, wherein the sensor data comprises sensor data from one or more implicit sensors.

6. The collaborative forecasting system of claim 1, wherein the one or more data acquisition networks are a mesh network, wherein the one or more data acquisition networks coordinate at least one of collection of the sensor data, processing of the sensor data, and transmission of the sensor data.

7. The collaborative forecasting system of claim 1, wherein the prediction module further comprises instructions to compare predicted weather conditions between a plurality of data acquisition networks.

8. A non-transitory computer-readable medium for vehicle-based weather detection and storing instructions that when executed by one or more processors cause the one or more processors to:
select one or more vehicles from a plurality of vehicles based on one or more network membership parameters;
form one or more data acquisition networks using the one or more selected vehicles;
receive sensor data from the one or more data acquisition networks based on one or more detection parameters;
predict one or more weather conditions using the sensor data; and
update one or more environmental elements based on the one or more predicted weather conditions, the environmental elements include at least one of a weather map, a vehicle route, advice based on one or more vehicle limitations, travel time estimates, and control system recommendations.

9. The non-transitory computer-readable medium of claim 8, further comprising instructions to control an autonomous driving module of one or more of the one or more selected vehicles based on the one or more updated environmental elements.

10. The non-transitory computer-readable medium of claim 8, wherein the one or more network membership parameters include at least one of vehicle generation, sensor reliability, and sensor availability.

11. The non-transitory computer-readable medium of claim 8, further comprising instructions to transmit the sensor data to a lead vehicle in the one or more data acquisition networks.

12. The non-transitory computer-readable medium of claim 8, wherein the sensor data comprises sensor data from one or more implicit sensors.

13. The non-transitory computer-readable medium of claim 8, further comprising instructions to compare predicted weather conditions between a plurality of data acquisition networks.

14. A method for vehicle-based weather detection, comprising:
    selecting one or more vehicles from a plurality of vehicles based on one or more network membership parameters;
    forming one or more data acquisition networks using the one or more selected vehicles;
    receiving sensor data from the one or more data acquisition networks based on one or more detection parameters;
    predicting one or more weather conditions using the sensor data; and
    updating one or more environmental elements based on the predicted weather conditions the environmental elements include at least one of a weather map, a vehicle route, advice based on one or more vehicle limitations, travel time estimates, and control system recommendations.

15. The method of claim 14, further comprising controlling an autonomous driving module of one or more of the one or more selected vehicles based on the updated one or more environmental elements.

16. The method of claim 14, wherein the one or more network membership parameters include at least one of vehicle generation, sensor reliability, and sensor availability.

17. The method of claim 14, further comprising transmitting the sensor data to a lead vehicle in the one or more data acquisition networks.

18. The method of claim 14, further comprising comparing predicted weather conditions between a plurality of data acquisition networks.

* * * * *

UNITED STATES PATENT AND TRADEMARK OFFICE
CERTIFICATE OF CORRECTION

| | |
|---|---|
| PATENT NO. | : 11,535,255 B2 |
| APPLICATION NO. | : 16/288781 |
| DATED | : December 27, 2022 |
| INVENTOR(S) | : Aghyad Saleh, Jason Schell and Neil Dutta |

It is certified that error appears in the above-identified patent and that said Letters Patent is hereby corrected as shown below:

In the Claims

Claim 14, Column 32, Line 7: delete "conditions the environmental" and insert --conditions, the environmental--

Signed and Sealed this
Fourteenth Day of February, 2023

Katherine Kelly Vidal
*Director of the United States Patent and Trademark Office*